US006799897B2

(12) United States Patent
Sherrer

(10) Patent No.: US 6,799,897 B2
(45) Date of Patent: Oct. 5, 2004

(54) OPTICAL CONNECTOR SYSTEM

(75) Inventor: David W. Sherrer, Radford, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 141 days.

(21) Appl. No.: 10/054,575

(22) Filed: Nov. 13, 2001

(65) Prior Publication Data

US 2003/0007740 A1 Jan. 9, 2003

Related U.S. Application Data

(60) Provisional application No. 60/249,806, filed on Nov. 16, 2000.

(51) Int. Cl.[7] .................................................. G02B 6/38
(52) U.S. Cl. .......................................... 385/55; 385/89
(58) Field of Search ............................. 385/55, 75, 76, 385/52, 53, 90, 91, 35, 54, 59, 65, 89, 92, 93

(56) References Cited

U.S. PATENT DOCUMENTS

| 4,451,115 A | 5/1984 | Nicia et al. |
| 4,818,058 A | 4/1989 | Bonanni |
| 5,123,073 A | 6/1992 | Pimpinella |
| 5,178,319 A | 1/1993 | Coucoulas |
| 5,179,609 A | 1/1993 | Blonder et al. |
| 5,299,272 A | 3/1994 | Buchin |
| 5,357,590 A | 10/1994 | Auracher |
| 5,377,900 A | 1/1995 | Bergmann |
| 5,500,910 A | 3/1996 | Boudreau et al. |
| 5,555,333 A | 9/1996 | Kato |
| 5,778,123 A | 7/1998 | Hagan et al. |
| 5,790,733 A | 8/1998 | Smith et al. |
| 6,062,740 A | 5/2000 | Ohtsuka et al. |
| 6,085,007 A | 7/2000 | Jiang et al. |
| 6,095,697 A | 8/2000 | Lehman et al. |
| 6,168,319 B1 | 1/2001 | Francis |
| 6,206,579 B1 | 3/2001 | Selfridge et al. |
| 2003/0034438 A1 | 2/2003 | Sherrer et al. |

OTHER PUBLICATIONS

Pearson et al., Fiber Optics, Encyclopedia of Chemical Technology, Third Edition, vol. 10, John Wiley & Sons, pp. 125–147 (1980).

*Primary Examiner*—Javaid H. Nasri
(74) *Attorney, Agent, or Firm*—Jonathan D. Baskin

(57) ABSTRACT

A system for aligning two optical connectors includes first and second connectors each having optical components housed therein. The first connector has V-shaped opposite side walls which define grooves therealong. The second connector has a pair of recesses defined in the front face which are dimensioned to receive a pair of alignment spheres. Upon assembly, the alignment spheres align and engage the V-shaped grooves to lock the two connectors in precise and secure alignment.

23 Claims, 3 Drawing Sheets

OPTICAL CONNECTOR SYSTEM

CROSS REFERENCE TO RELATED APPLICATIONS

The present application claims priority to U.S. provisional application Ser. No. 60/249,806 filed Nov. 16, 2000.

BACKGROUND

1. Technical Field

The present disclosure relates to connector systems. More particularly, the present disclosure includes an optical connector system which utilizes a pair of alignment spheres to align and secure two connectors.

2. Description of the Related Art

Because of the increasing need for higher capacity data and voice transmission, optoelectronic systems, i.e., systems which combine both electrical components and optical components, are becoming more common in many applications. The information carrying capacity of optical systems is superior to that of purely electronic systems, hence the motivation to incorporate optical fiber arrays with semiconductor systems. However, alignment of such fiber arrays either with other fiber arrays or with optical components is difficult, especially for the case of single mode fibers which have an extremely small core diameter (e.g., less than 10 microns)

A typical connector for fiber arrays consists of two substrates of silicon with grooves formed therein for accommodating the fibers. Each substrate is formed from two mated members which are bonded together to encase the fibers. The grooves are formed prior to bonding. Thus, for example, the grooves can be formed by anisotropically etching a major surface of each substrate in an array corresponding to the fibers. When the members are bonded, each fiber lies in a groove which is precisely aligned with all other fibers in the array.

While the fibers within a substrate may be fairly closely aligned with each other, a problem exists in precisely aligning these fibers with another fiber array or with an array of optical components. One technique employs precisely controlling the thickness of each substrate and precisely lapping the edges of each substrate for alignment of different substrates.

Another approach employs etching deep grooves in the top and bottom surfaces of each substrate and then aligning the two substrates by means of a chip extending between the two substrates. The chip has ridges which fit within the grooves.

A still further approach employs grooves which are machined on the edges of the substrates. Alignment pins pressed into the grooves by spring clips bridge the gap between substrates. In these various techniques, precise machining is required, which adds to the expense of manufacturing the connector.

An alternative approach is to form deeper alignment grooves in the same surfaces of the silicon members at the same time as the fiber grooves. Guiding rods are pressed into the alignment grooves by spring plates and span the gap between substrates to provide proper alignment.

Yet there exists a need to develop a connector system for optical fibers which precisely aligns two connectors in an effective and less expensive manner.

SUMMARY

The present invention relates to an optical connector system for aligning two optical connectors. The system includes a first connector having at least one optical component disposed therein, the first connector having opposite side walls, each side wall including a groove. The system also includes a pair of alignment spheres each having a sphere center, and a second connector having a planar front face and at least one optical component disposed therein. The second connector also includes a pair of recesses defined in the planar front face which are dimensioned to at least partially seat the alignment spheres. Each sphere center is distanced from the planar front face so as to engage a corresponding groove defined within the side walls of the first connector.

Also provided herein is a method for aligning two optical components employing the optical connector system described herein. The method includes: seating each of the alignment spheres in a respective one of the recesses; positioning the front planar face of the first connector adjacent the front planar face of the second connector; aligning each of the alignment spheres seated within the recesses with a corresponding groove defined within each side wall; and engaging the alignment spheres with the grooves in a secure, wedge-like manner.

The connector system advantageously provides a simple and effective means for aligning optical signal carriers, and more particularly, optical fibers, with other optical or optoelectronic equipment.

BRIEF DESCRIPTION OF THE DRAWINGS

Various embodiments are described below with reference to the drawings wherein.

DETAILED DESCRIPTION OF PREFERRED EMBODIMENTS

The connector system embodiments described herein are useful for coupling a wide range of optical components such as optical fibers, lenses, laser diodes, light emitting diodes (LEDs), photodetectors, and the like. For example, the connector system described herein can be used to couple two fiber arrays or a fiber array and a gradient index (GRIN) lens array. Moreover, the connector system can be used to couple a silicon chip to a mechanical transfer (MT) connector or ferrule. Additionally, while particular embodiments of the connector system are described herein with reference to optical fibers, it should be understood that the present connector system is not limited to optical fibers but encompasses any type of optical component.

Figure 1:
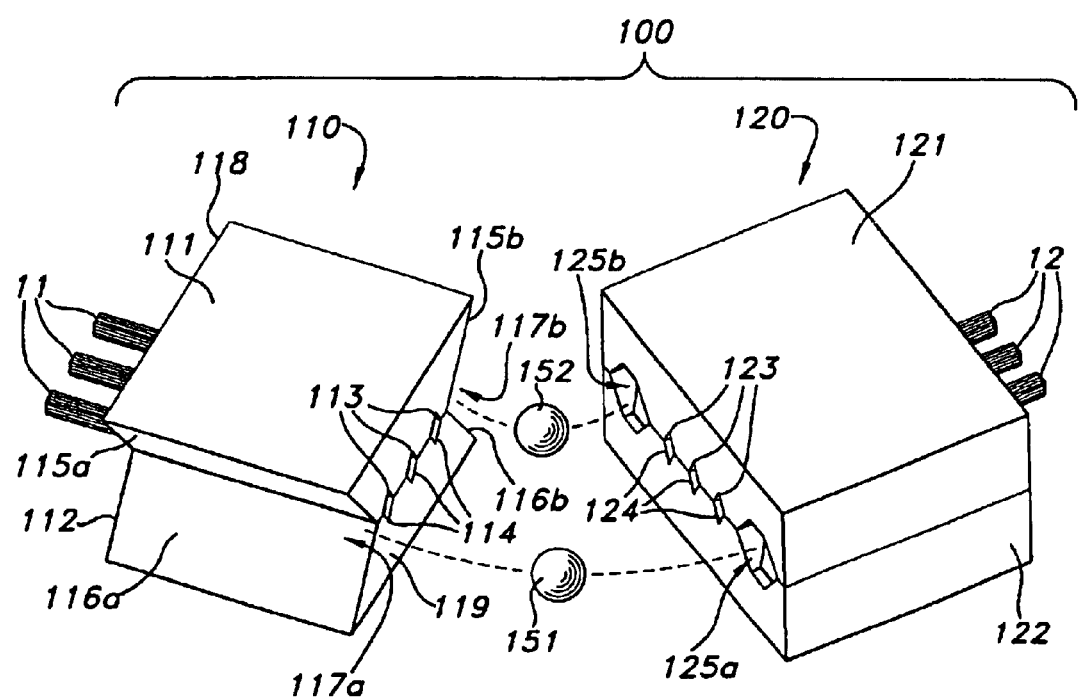
FIG. 1 is a perspective view of the connector system.

Referring now to FIG. 1, connector system 100 is shown which includes a first housing assembly 110, a second housing assembly 120, and a pair of alignment spheres 151, 152.

First housing assembly 110 includes a rear face 118 and a front face 119, V-shaped side walls 117a, and 117b and is fabricated from two blocks 111 and 112. Blocks 111, 112 can be made of any material known to be useful for the production of optoelectronic connectors. Suitable materials include, but are not limited to, ceramics, plastics or metals. In particularly useful embodiments, blocks 111, 112 are made from single crystal silicon.

Blocks 111, 112 are joined together at facing major surfaces. Block 111 has one or more grooves formed therein in a longitudinal direction along the facing major surface. Likewise, block 112 has one or more grooves 114 formed therein which reside in parallel relation to and are aligned with corresponding grooves 113 of block 111. Grooves 113, 114 can be formed using any technique known to those skilled in the art, such as, for example, anisotropical etching of (100) silicon with potassium hydroxide.

The grooves 113, 114 of each block are configured, positioned and dimensioned such that when blocks 111 and 112 are joined at their facing major surfaces (as shown in FIG. 1) the corresponding grooves 113, 114 form channels which are dimensioned to receive optical signal carriers therein. Suitable optical signal carriers include optical fibers 11.

Block 111 has angled side surfaces 115a and 115b. Block 112 likewise has angled side surfaces 116a and 116b. The angled side surfaces 115a, 115b, 116a, and 116b can be formed by any suitable method such as, for example, cutting, grinding or anisotropic etching. When blocks 111 and 112 are joined, side surfaces 115a and 116a form a V-shaped side wall 117a extending along first housing 110. Likewise, when blocks 111 and 112 are joined, side surfaces 115b and 116b form an opposite V-shaped side wall 117b extending along the opposite side of housing 110.

Use of a single crystal for the block material facilitates the precise forming of the groove surfaces by taking advantage of the crystal planes of the block material. For example, a silicon block with a major surface in the (100) crystallographic plane will be etched anisotropically to form grooves with surfaces lying in the (111) planes. Therefore, the angle of the two sloping walls of a groove will always be precisely determined by the orientation of the crystal planes with respect to the major structure regardless of the time of etching the major surface. The size of the opening will therefore primarily be determined by the size of the openings in the etch mask. Even if some over-etching or under-etching of the grooves should occur, the angles of the groove walls will remain the same and the position of each fiber will shift with respect to the major surface of the block by the same amount. Thus, the fibers will always be rectilinear. Etching can be performed using standard etching techniques and materials such as potassium hydroxide, which are known to those with skill in the art.

It will be appreciated that while the grooves 113 and 114 are shown with a "V" configuration, it is also possible to achieve grooves of other configurations. For example, grooves with a flat bottom can be formed by stopping the etching short of a complete etching of the crystal planes. These are known in the art as "U-grooves." However, sloping sidewalls with the same orientation will still be produced.

As mentioned above, optical fibers are preferably disposed within grooves 113, 114 when the blocks 111, 112 are assembled. Generally, optical fibers 11 are extremely thin filaments of glass or plastic. A review of optical fibers can be found in the Encyclopedia of chemical technology, Vol. 10, pp. 125–147 (1980), the contents of which are herein incorporated by reference. Known optical fibers 11 typically include a glass core material that exhibits a first predetermined index of refraction and a glass cladding material that exhibits a second predetermined index of refraction. To promote the propagation of light within the core region of the optical fiber, the index of refraction of the core material is typically higher than that of the cladding material.

The glass core material may be manufactured from high purity glass, single crystals drawn into fibers, fused silica or quartz. Various methods of manufacturing optical fiber are known in the art and are within the purview of this application. Typically, the optical fibers can be of any suitable size and ordinarily range in diameter from about 100 microns to about 1,000 microns, with 125 microns being typical.

Second housing 120 is preferably fabricated from the same or similar materials as first housing 110. Second housing 120 is advantageously fabricated from two blocks 121 and 122. As with first housing 110, single crystal silicon is a particularly useful material of construction for blocks 121, 122. As with the formation of grooves 113, 114 in blocks 111, 112, grooves 123, 124 are formed in blocks 121, 122, respectively, in the same manner as indicated above. Grooves 123, 124 align to form channels when blocks 121 and 122 are joined to form the second housing 120. Channels are configured, positioned and dimensioned for the reception of the optical signal carriers, e.g., optical fibers 12.

The planar front engagement face 129 of second 120 housing also includes at least one, and preferably two, recesses 125a and 125b. Recesses 125a, 125b can be formed by any known technique such as, for example, anisotropically etching the front engagement face 129 of the second housing 120, and then shaping the recesses 125a and 125b with a dicing saw. Recesses 125a and 125b are adapted to receive alignment spheres 151 and 152, respectively, and serve as alignment fiducials.

Alignment spheres 151, 152 are highly precise balls fabricated from, for example, steel, tungsten carbide, ceramic, glass, plastic, or other suitable material. Alignment spheres 151 and 152 can have a diameter ranging from about 0.5 mm to about 3 mm and a diameter tolerance of about ±0.5 microns to assure proper alignment. As can be appreciated, tolerance can vary depending on the material used to fabricate the alignment sphere. It will be recognized that the diameters and tolerances of alignment spheres 151 and 152 can be outside the range given above without departing from the spirit or scope of the invention.

Figure 2:
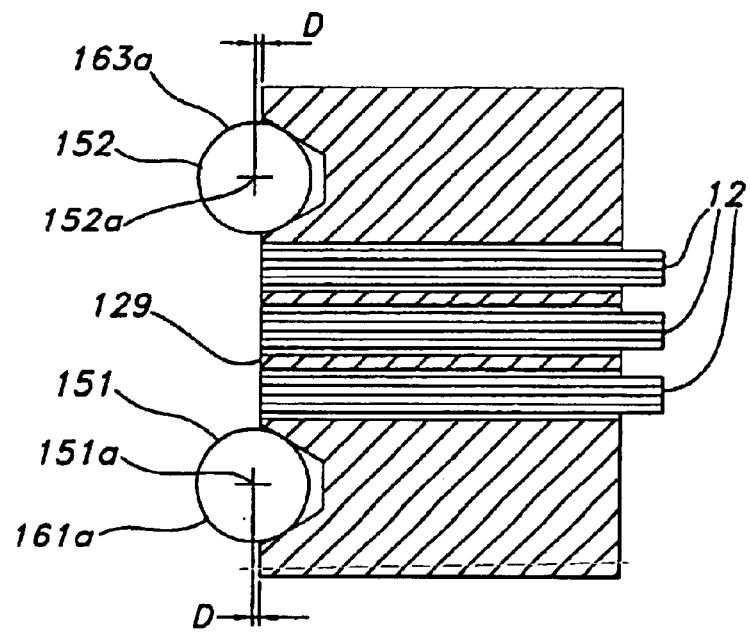
FIG. 2 is a sectional view of the second housing.
Figure 3:
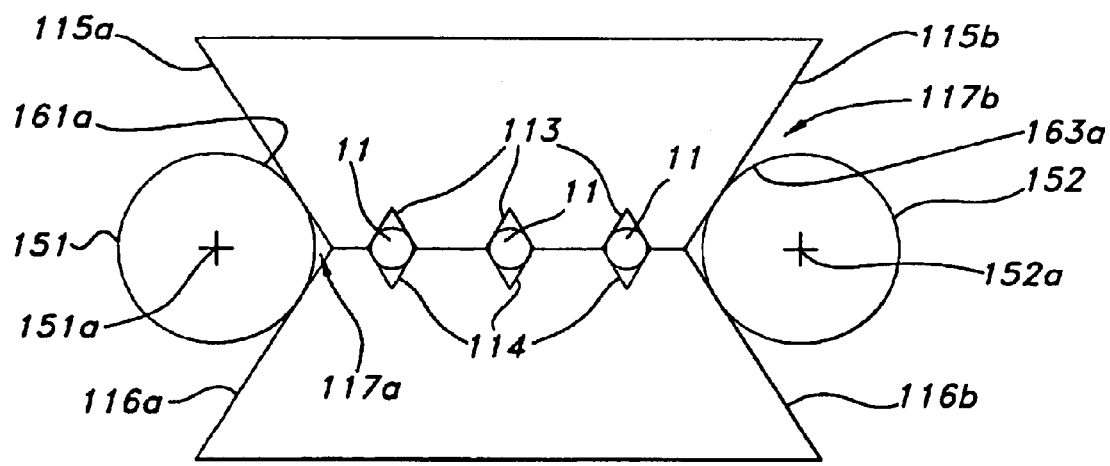
FIG. 3 is an end view of the MT connector showing the positioning of the alignment spheres.

Referring to FIGS. 2 and 3, a significant feature of the present structure is the seating of alignment spheres 151 and 152 in their respective recesses 125a and 125b. More particularly, recesses 125a and 125b are configured and dimensioned such that when seated, the sphere centers 151a and 152a of alignment spheres 151 and 152, respectively, are each distanced from the plane of the front engagement face 129 by a distance "D". Preferably, distance "D" ranges from about 5 microns to about 500 microns, and more preferably ranges from about 10 microns to about 250 microns. The sphere centers 151a and 152a lie along the portion of the sphere having the longest diameter, the purpose of which is explained in more detail below.

As mentioned above, and as best shown in FIGS. 1–3, each alignment sphere 151, 152 is dimensioned to partially seat within a corresponding recess 125a, 125b such that the sphere centers 151a, 152a (i.e., the portion of the sphere 151, 152 with the longest diameter) remain distanced from face 129 of housing 120 (FIG. 2). It is envisioned that seating the spheres 151 and 152 in this manner will facilitate mechanical engagement of the two housings 110 and 120 as explained in greater detail below.

During assembly, first housing 110 and second housing 120 are brought into close adjacency to one another such that the front engagement face 129 of second housing 120 and the engagement face 119 of the first housing 110 closely abut one another. As mentioned above, alignment spheres 151 and 152 are seated within housing 120 such that an innerfacing surface 161a, 163a of each sphere aligns for engagement within the V-shaped side walls 117a, 117b of housing 110. As best shown in FIG. 3, the sphere centers 151a, 152a of alignment spheres 151 and 152 wedge within the respective V-shaped side walls 117a and 117b such that the sphere center 151a of alignment sphere 151 is securely positioned between angled surfaces 115a and 116a, and the sphere center 152a of alignment sphere 152 is positioned between angled surfaces 115b and 116b. As can be appreciated, positioning the sphere centers 151a, 152a relative to the front face 129 of housing 120 facilitates secure engagement of the two housings 110, 120 during assembly, i.e., the widest portion of each sphere 151, 152 wedges within the respective V-shaped groove of each side wall 117a, 117b.

The alignment spheres 151 and 152 are preferably held in place in recesses 125a and 125b by the use of any suitable bonding agent such as epoxy resin adhesive, UV-cured acrylic resin, and the like. Alternatively, the recesses 125a and 125b can be coated with aluminum and the alignment spheres 151 and 152 bonded in place in the respective recesses by a process known as AlO bonding, such as described in U.S. Pat. No. 5,178,319, which is herein incorporated by reference in its entirety.

Preferably, the alignment spheres are first fixedly mounted within the respective recesses by a suitable bonding method such as described above. After the first and second housings are brought together and the sphere centers 151a and 152a are positioned within the respective V-shaped side walls 117a and 117b, more adhesive can be applied to the spheres and V-shaped sidewall region to fixedly secure the alignment spheres 151 and 152 within the V-shaped sidewalls, and to maintain the first and second housings 110 and 120 in secure alignment.

Figure 4:
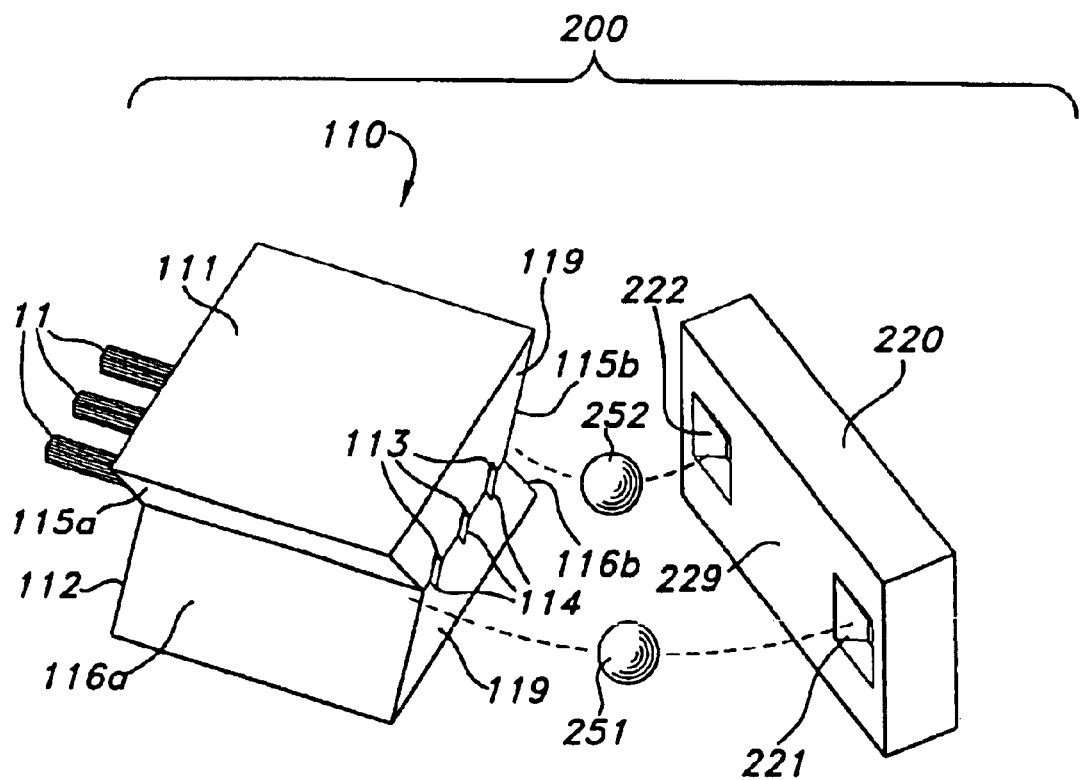
FIG. 4 is a perspective view of an alternative embodiment of the connector system.
Figure 5:
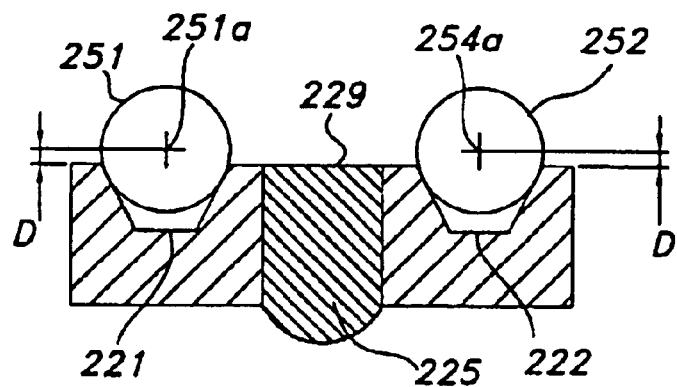
FIG. 5 is a sectional view of an alternative second housing.

FIGS. 4 and 5 show an alternative embodiment of the connector system 200 which includes the MT connector of embodiment 100, i.e., first housing 110, alignment spheres 251 and 252, and a silicon chip 220. Chip 220 includes a front face 229 having a series of fiducial recesses 221 and 222 defined therein which are dimensioned to receive alignment spheres 251 and 252, respectively. Preferably, chip 220 is anisotropically etched to form recesses 221 and 222.

As can be appreciated, housing 220 can also include other or additional optical components, e.g., a gradient index (GRIN) lens 225, or other types of optical assemblies.

Much like the previous embodiment, the alignment spheres 251 and 252 are seated in their respective recesses 221, 222 such that the respective sphere centers 251a and 252a are distanced from the front face 229 of the chip 220 by a distance D. Again, mechanical engagement of the housing 110 and the chip 220 is facilitated by dimensioning the spheres 251, 252 to partially seat within the respective recesses 221, 222 as described above.

The alignment spheres 251 and 252 can be held in place by a bonding agent such as epoxy adhesive, UV-cured acrylic resin, or by any other suitable bond method such as described above.

While the above description contains many specifics, these specifics should not be construed as limitations on the scope of the invention, but merely as exemplifications of preferred embodiments thereof. For example, while the connector system has been described herein with respect to optical fiber connectors and assemblies, the present system can be used in other settings such as, for example, semiconductor. Although the optical fibers schematically shown in the figures are generally cylindrical (i.e., with a circular cross section), the present disclosure is not limited to fibers of any particular cross sectional configuration. The methods described herein can be readily adapted by those skilled in the art for use of fibers having other cross sectional geometries, including, but not limited to, polygonal elliptical, bow-tie, tapered, and planar or flat slab type optical wave guides. Such fibers/waveguides are commonly available for a variety of applications. Those skilled in the art will envision many other possibilities within the scope and spirit of the invention as defined by the claims appended hereto.

What is claimed is:

1. A system for aligning two optical connectors, the system comprising:
   a) a first connector having at least one optical component, a front face and opposite side walls extending from and non-parallel to the front face, each side wall including a groove defined therealong;
   b) a pair of alignment spheres each having a sphere center; and
   c) a second connector having a front face and at least one optical component, said second connector including a pair of recesses defined in said front face, said recesses being dimensioned to at least partially seat said alignment spheres such that each of said sphere centers is distanced from said second connector front face so as to mechanically engage a corresponding groove defined within said side walls of said first connector, wherein said first connector face faces said second connector face.

2. The system of claim 1 wherein at least one of said grooves of the first connector is a longitudinal groove having a V-shaped cross/section.

3. The system of claim 2 wherein the sphere center of each alignment sphere is disposed within a respective V-shaped groove.

4. A system for aligning two optical connectors, the system comprising:
   a) a first connector having at least one optical component, said first connector having opposite side walls, each side wall including a groove defined therealong;
   b) a pair of alignment spheres each having a sphere center; and
   c) a second connector having a front face and at least one optical component, said second connector including a pair of recesses defined in said front face, said recesses being dimensioned to at least partially scat said alignment spheres such that each of said sphere centers is distanced from said front face so as to mechanically engage a corresponding groove defined within said side walls of said first connector wherein the sphere center of each alignment sphere is distanced from the plane of the front face of said second connector by a distance ranging from about 10 microns to about 250 microns.

5. The system of claim 1 wherein each of said recesses of said second connector is generally pyramidal in shape.

6. The system of claim 1 wherein the alignment sphere is fabricated from a material selected from the group consisting of steel, tungsten carbide, ceramic, glass and plastic.

7. The system of claim 1 wherein at least one of said first and second connectors includes a gradient index lens.

8. The system of claim 1 wherein at least one of said first and second connectors is fabricated from silicon.

9. The system of claim 1 wherein at least one of the first and second connectors is fabricated from single crystal silicon.

10. A system for aligning two optical connectors, the system comprising:
   a) a first connector having at least one optical component, said first connector having a front face and opposite side walls extending from and non-parallel to the front face, each side wall including a longitudinal V-shaped groove defined therealong;
   b) a pair of alignment spheres each having a sphere center; and
   c) a second connector having a front face and at least one optical component, said second connector including a pair of recesses defined in said front face, said recesses being dimensioned to at least partially seat said alignment spheres such that each of said sphere centers is distanced from said front face so as to mechanically engage a corresponding V-shaped groove defined within said side walls of said first connector, wherein said first connector face faces said second connector face;
   wherein at least one of the first and second connectors is fabricated from single crystal silicon and wherein at least one of said connectors includes first and second blocks, each block having a major surface in a (100) crystallographic plane, said major surface of the first block being joined to the major surface of the second block, said major surface of each block being etched to form at least one longitudinal groove for receiving an optical signal carrier.

11. A method for aligning two optical components, said method comprising the steps of:
   a) providing a first connector having a front face, at least one optical component and opposite side walls extending from and non-parallel to the front face, each side wall including a groove;
   b) providing a pair of alignment spheres each having a sphere center;
   c) providing a second connector having a front face and at least one optical component, said second connector including a pair of recesses defined in said front face, each of said recesses being dimensioned to at least partially seat one of said alignment spheres, wherein said first connector face faces said second connector face;
   d) seating each of said alignment spheres in a respective one of said recesses;
   e) positioning the front face of said first connector alignment adjacent the front face of said second connector;
   f) aligning each of said alignment spheres seated within said recesses with a corresponding groove defined within each side wall; and
   g) engaging said alignment spheres with said grooves in a secure, wedge-like manner.

12. The method of claim 11 wherein the side walls of said first connector are V-shaped.

13. The method of claim 12 wherein the sphere center of each alignment sphere is disposed within a respective V-shaped side wall.

14. A method for aligning two optical components, said method comprising the steps of:
   a) providing a first connector having a front face and at least one optical component and opposite side walls each including a groove;
   b) providing a pair of alignment spheres each having a sphere center;
   c) providing a second connector having a front face and at least one optical component, said second connector including a pair of recesses defined in said front face, each of said recesses being dimensioned to at least partially seat one of said alignment spheres;
   d) seating each of said alignment spheres in a respective one of said recesses;
   e) positioning the front face of said first connector alignment adjacent the front face of said second connector;
   f) aligning each of said alignment spheres seated within said recesses with a corresponding groove defined within each side wall; and
   g) engaging said alignment spheres with said grooves in a secure, wedge-like manner wherein the sphere center of each alignment sphere is distanced from the plane of the front face of said second connector by a distance ranging from about 10 microns to about 250 microns.

15. The method of claim 11 wherein each of said recesses of said second connector is generally pyramidal in shape.

16. The method of claim 11 wherein the alignment sphere is fabricated from a material selected from the group consisting of steel, tungsten carbide, ceramic, glass and plastic.

17. The method of claim 11 wherein at least one of said first and second connectors includes a gradient index lens.

18. The method of claim 11 wherein at least one of said first and second connectors is fabricated from silicon.

19. The method of claim 11 wherein at least one of the first and second connectors is fabricated from single crystal silicon.

20. The method of claim 19 wherein at least one of said connectors includes first and second blocks, each block having a major surface in a (100) crystallographic plane, said major surface of the first block being joined to the major surface of the second block, said major surface of each block being etched to form at least one longitudinal groove for receiving an optical signal carrier.

21. The system of claim 1 wherein the optical components of the first connector and the second connector are chosen from optical fibers, lenses, laser diodes, light emitting diodes, photodetectors, and combinations thereof.

22. The system of claim 10 wherein the optical components of the first connector and the second connector are chosen from optical fibers, lenses, laser diodes, light emitting diodes, photodetectors, and combinations thereof.

23. The method of claim 11 wherein the optical components of the first connector and the second connector are chosen from optical fibers, lenses, laser diodes, light emitting diodes, photodetectors, and combinations thereof.

* * * * *